US006976145B1

(12) United States Patent
Bradford

(10) Patent No.: US 6,976,145 B1
(45) Date of Patent: Dec. 13, 2005

(54) METHOD AND APPARATUS FOR AUTOMATICALLY CONFIGURING DATA STORAGE SUBSYSTEMS

(75) Inventor: Barry Lynn Bradford, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 327 days.

(21) Appl. No.: 10/635,890

(22) Filed: Aug. 6, 2003

(51) Int. Cl.[7] ............................................. G06F 12/02
(52) U.S. Cl. ................. 711/170; 711/1; 711/5; 711/148; 714/5
(58) Field of Search ........................ 711/170

(56) References Cited

U.S. PATENT DOCUMENTS

| | | | |
|---|---|---|---|
| 5,239,659 A | 8/1993 | Rudeseal et al. ............ 395/800 |
| 5,381,403 A * | 1/1995 | Maher et al. ................ 370/254 |
| 5,438,671 A | 8/1995 | Miles .......................... 395/200 |
| 5,537,533 A | 7/1996 | Staheli et al. ........... 395/182.03 |
| 5,557,735 A * | 9/1996 | Pinkston et al. ............... 714/1 |
| 5,604,906 A | 2/1997 | Murphy et al. .............. 395/712 |
| 5,640,535 A | 6/1997 | Suzuki et al. ............. 395/497.01 |
| 5,907,679 A | 5/1999 | Hoang et al. ............. 395/200.5 |
| 6,038,399 A | 3/2000 | Fisher et al. ................. 395/712 |
| 6,052,797 A | 4/2000 | Ofek et al. ...................... 714/6 |
| 6,108,147 A | 8/2000 | Jeon ............................. 360/15 |
| 6,131,141 A | 10/2000 | Ravid .......................... 711/112 |
| 6,144,992 A | 11/2000 | Turpin et al. ................ 709/208 |
| 6,260,125 B1 | 7/2001 | McDowell ................... 711/162 |
| 6,324,654 B1 | 11/2001 | Wahl et al. ...................... 714/6 |
| 6,477,591 B1 | 11/2002 | VanderSpek .................. 710/38 |
| 2003/0033494 A1 * | 2/2003 | Fujibayashi et al. ........ 711/162 |
| 2004/0204070 A1 * | 10/2004 | August et al. ............... 455/557 |

FOREIGN PATENT DOCUMENTS

| | | | |
|---|---|---|---|
| DE | 10147503 A1 * | 4/2003 | |
| GB | 2276257 A * | 9/1984 | |
| GB | 2404472 A * | 2/2005 | |

* cited by examiner

Primary Examiner—B. James Peikari
(74) Attorney, Agent, or Firm—Yee & Associates, P.C.

(57) ABSTRACT

A method and apparatus are disclosed in a data processing system for automatically replicating a first data storage subsystem's configuration data on a second data storage subsystem. Storage subsystems are peripherals of the data processing system and not standalone computer systems. Storage subsystem are inaccessible directly by users. A first data storage subsystem is specified as a parent subsystem. The first data storage subsystem is configured using a first configuration data. A second data storage subsystem is specified that is to be configured the same as the first data storage subsystem. The first or second data storage subsystem automatically initiates a transfer of a copy of the first configuration data from the first data storage subsystem to the second data storage subsystem. The second data storage subsystem configures itself using the copy of the first configuration data such that the second data storage subsystem is configured the same as the first data storage subsystem.

20 Claims, 4 Drawing Sheets

METHOD AND APPARATUS FOR AUTOMATICALLY CONFIGURING DATA STORAGE SUBSYSTEMS

BACKGROUND OF THE INVENTION

1. Field of the Invention

The present invention relates generally to data storage subsystems and particularly to a method and apparatus for automatically configuring data storage subsystems. Still more particularly, the present invention relates to a method and apparatus for automatically replicating a first data storage subsystem's configuration data on a second data storage subsystem.

2. Background of the Invention

A data storage subsystem is a peripheral of a computer system that is used to store data for the computer system. A data storage subsystem typically includes one or more disk or tape drives and a controller for managing the drives included in the storage subsystem. A data storage subsystem is not a stand alone computer system. Although a storage subsystem does execute an operating system, users may not interact directly with the storage subsystem. A user may interact directly with computer systems, but may not interact directly with a data storage subsystem.

In order for a new data storage subsystem to be used as a peripheral, the data storage subsystem must have a functioning operating system and the subsystem must be configured. After a data storage subsystem has been configured, it is ready to store user data. When a new data storage subsystem is first turned on, an operating system will start on the storage subsystem. In addition to an operating system executing properly, the storage subsystem must be configured prior to it being used as a peripheral. A data storage subsystem is configured by adding or specifying configuration data for the subsystem. Examples of configuration data include the number and names of volumes in the data storage subsystem, the number and names of partitions in the subsystem, the particular grouping(s) of the volumes and partitions, how the ports of the subsystem are connected, addresses of the various ports, telephone numbers for the ports, a site identifier, and any other data that may be used as configuration data. After the data storage subsystem is configured, it may be used to store user data. A data storage subsystem is not capable of storing user data until the subsystem has been configured.

There is a need to replicate a particular data storage subsystem's configuration in order to provide a redundant, backup subsystem. In the prior art, in order to replicate a particular data storage subsystem's configuration, an administrator must first obtain a copy of the configuration data from a first subsystem, and the administrator must then install the copy of the configuration data on a second subsystem. Once the administrator has installed the configuration data on the second storage subsystem, the administrator must restart the second storage subsystem in order for the configuration to be complete.

This manual approach is very time consuming. If the administrator manually performs this process using a remote host, an expensive resource, the remote host, is tied up while the administrator completes this process.

Therefore, the current technology would be improved by a method and apparatus for automatically replicating a first data storage subsystem's configuration data on a second data storage subsystem.

SUMMARY OF THE INVENTION

A method and apparatus are disclosed in a data processing system for automatically replicating a first data storage subsystem's configuration data on a second data storage subsystem. Storage subsystems are peripherals of the data processing system and not standalone computer systems. Storage subsystems are inaccessible directly by users. A first data storage subsystem is specified as a parent subsystem. The first data storage subsystem is configured using a first configuration data. A second data storage subsystem is specified that is to be configured the same as the first data storage subsystem. The first or second data storage subsystem automatically initiates a transfer of a copy of the first configuration data from the first data storage subsystem to the second data storage subsystem. The second data storage subsystem configures itself using the copy of the first configuration data such that the second data storage subsystem is configured the same as the first data storage subsystem.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
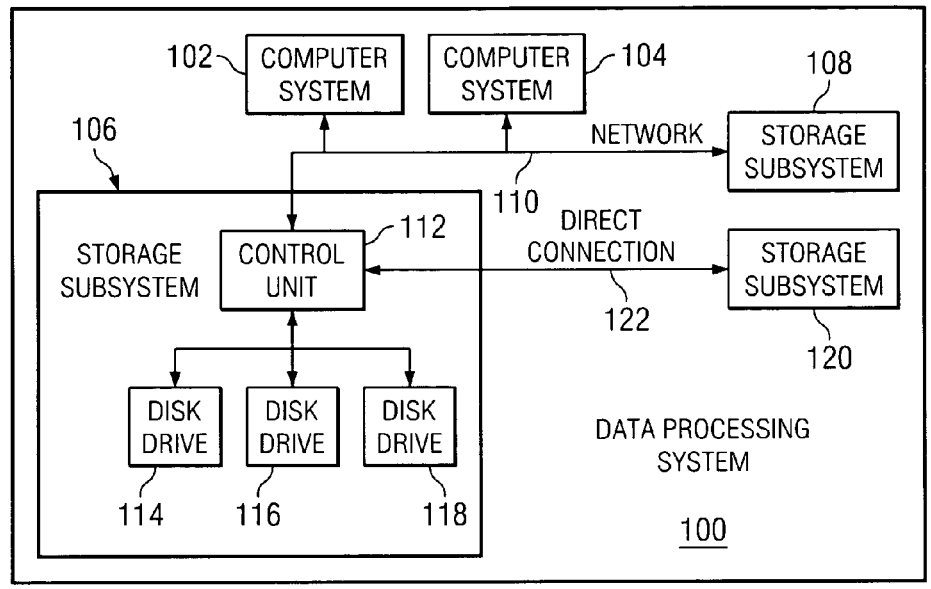
FIG. 1 is a high level block diagram of a data processing system that includes computer systems and storage subsystems in accordance with the present invention.

The present invention is a method and apparatus for automatically replicating a first data storage subsystem's configuration data on a second data storage subsystem. The first data storage subsystem is referred to herein as a parent storage subsystem. The second data storage subsystem is referred to herein as a clone data storage subsystem.

When the configuration data of a parent is to be replicated, a storage subsystem that is to be the clone storage subsystem is selected. An automatic configuration facility is enabled on both the parent and the clone. An address is provided to the clone storage subsystem which identifies the parent whose configuration data is to be copied. The address of the clone is also provided to the parent.

A communications link is then established between the parent and clone storage subsystems. This communications link is preferably a dedicated link. At this time the two storage subsystems are physically linked together.

Each storage subsystem includes flags that indicate whether the transfer of the configuration data is to be a push or pull type of transfer. When a push is indicated to both the parent and the clone, the parent sends a copy of its configuration data to the clone. When a pull is indicated to both the parent and clone, the clone contacts the parent and retrieves a copy of the parent's configuration data. Preferably, the configuration data is transferred in a single file using a file transfer process. Of course, those skilled in the art will recognize that other processes may be used.

The automatic configuration facility includes status, completion, and error handling within the facility itself. In this manner, the facility itself monitors the data transfer.

The concept of replicating the configuration of a parent storage subsystem using an automatic configuration utility allows the replication workload to be internalized to the storage subsystem that is to be the clone of the parent. Internalization allows for exact replication, thus reducing errors and increasing performance during the configuration stage. The process of internalizing and automating the configuration of a storage subsystem can be achieved by having the storage subsystem share their configuration data rather than having the configuration data input into the clone storage subsystem through conventional means.

According to the present invention, a storage subsystem has the ability to enable the automatic configuration facility. The facility has an addressing scheme for each storage subsystem. The facility is enabled on the storage subsystems through an enabling software utility that is part of the operating system of the storage subsystem. The addressing scheme for the storage subsystems is dependent on the communication link type use to interconnect the storage subsystems. Each storage subsystem can be set as either a sender or receiver.

According to the present invention, a transfer of configuration data may be either a push or a pull type of transfer. Configuration data may be pushed from a parent storage subsystem to a storage subsystem that is to be the clone storage subsystem. When a push type of transfer occurs, the parent is set as the sender and the clone is set as the receiver. The parent then initiates the transfer of the copy of the parent's configuration data. When a pull type of transfer occurs, the parent is also set as the sender and the clone is set as the receiver. In the pull arrangement, however, the clone initiates the transfer of the copy of the parent's configuration data.

The present invention automatically configures a data storage subsystem by replicating configuration data. The present invention does not describe replicating user data that might be stored on a parent storage subsystem, but instead describes replicating only the configuration data of a parent storage subsystem. A data storage subsystem may be thought of having three layers of information. In order to be operable, an operating system is required in the storage subsystem that is executed by the controller. The operating system may be thought of as the first layer. The next layer is the configuration data. The storage subsystem must be configured with configuration data before the storage subsystem may be used. Finally, the last layer is the user data. The present invention describes replicating only the configuration data. The present invention does not describe replicating user data.

The present invention provides for quick, accurate, and efficient replications of storage subsystems using an automatic facility. Once enabled, the facility transfers the configuration data between the parent and clone storage subsystems automatically, without user intervention, in order to create a replica of the parent's configuration.

According to an additional feature of the present invention, the automatic replication facility may remain active providing ongoing replication of configuration data from the parent to the clone. Therefore, constant interaction and updates from the parent to the clone would occur.

FIG. 1 is a high level block diagram of a data processing system 100 that includes computer systems and storage subsystems in accordance with the present invention. Data processing system 100 includes a computer system 102 and a computer system 104 that are coupled to storage subsystem 106 and storage subsystem 108 via a network 110. Computer systems 102 and 104 are standalone computer systems. A storage subsystem is not a standalone computer system. A user may not interact directly with the storage subsystem. A user must use one of the computer systems in order to access a storage subsystem.

Each storage subsystem includes a controller and one or more disk or tape drives. For example, storage subsystem 106 includes a control unit 112 and disk drives 114, 116, and 118.

FIG. 1 depicts two storage subsystems, subsystems 106 and 120, that are linked together using a direct communication link 122. This direct connection 122 may be used to transfer configuration data from one of these storage subsystems to the other. For example, storage subsystem 106 might be a new or existing storage subsystem that has been designated to be the clone or replicated subsystem for storage subsystem 120.

Figure 2:
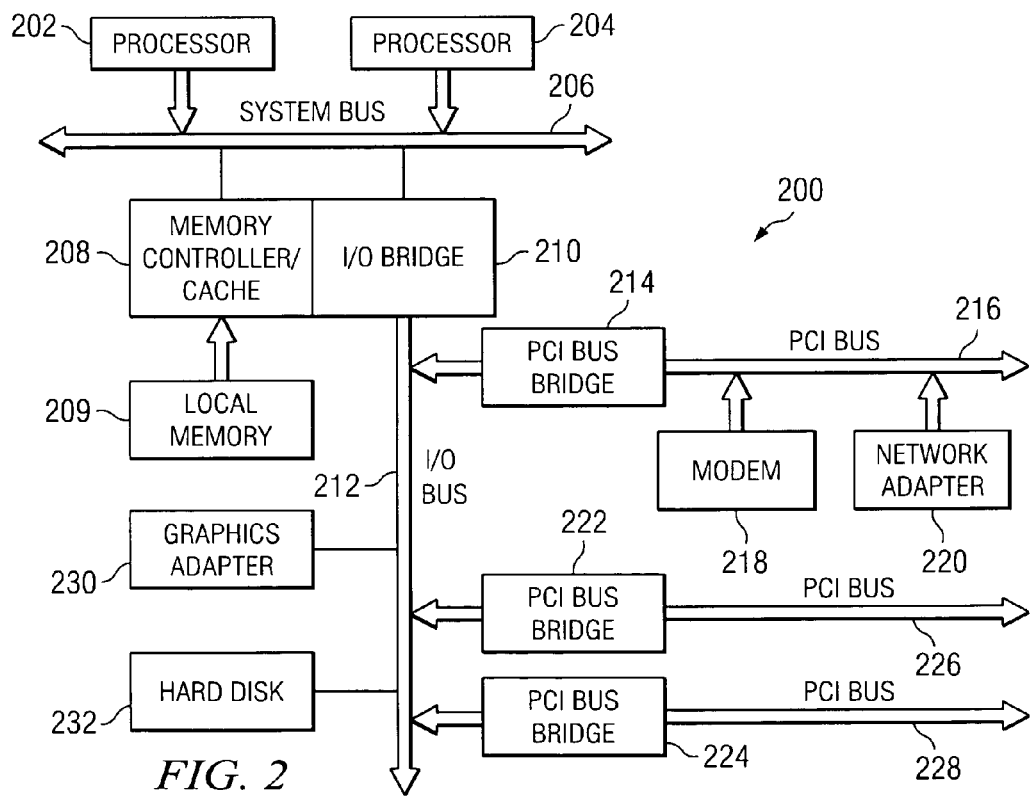
FIG. 2 depicts a block diagram of a computer system that may be used to implement a computer system in accordance with the present invention.

FIG. 2 depicts a block diagram of a computer system in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3A:
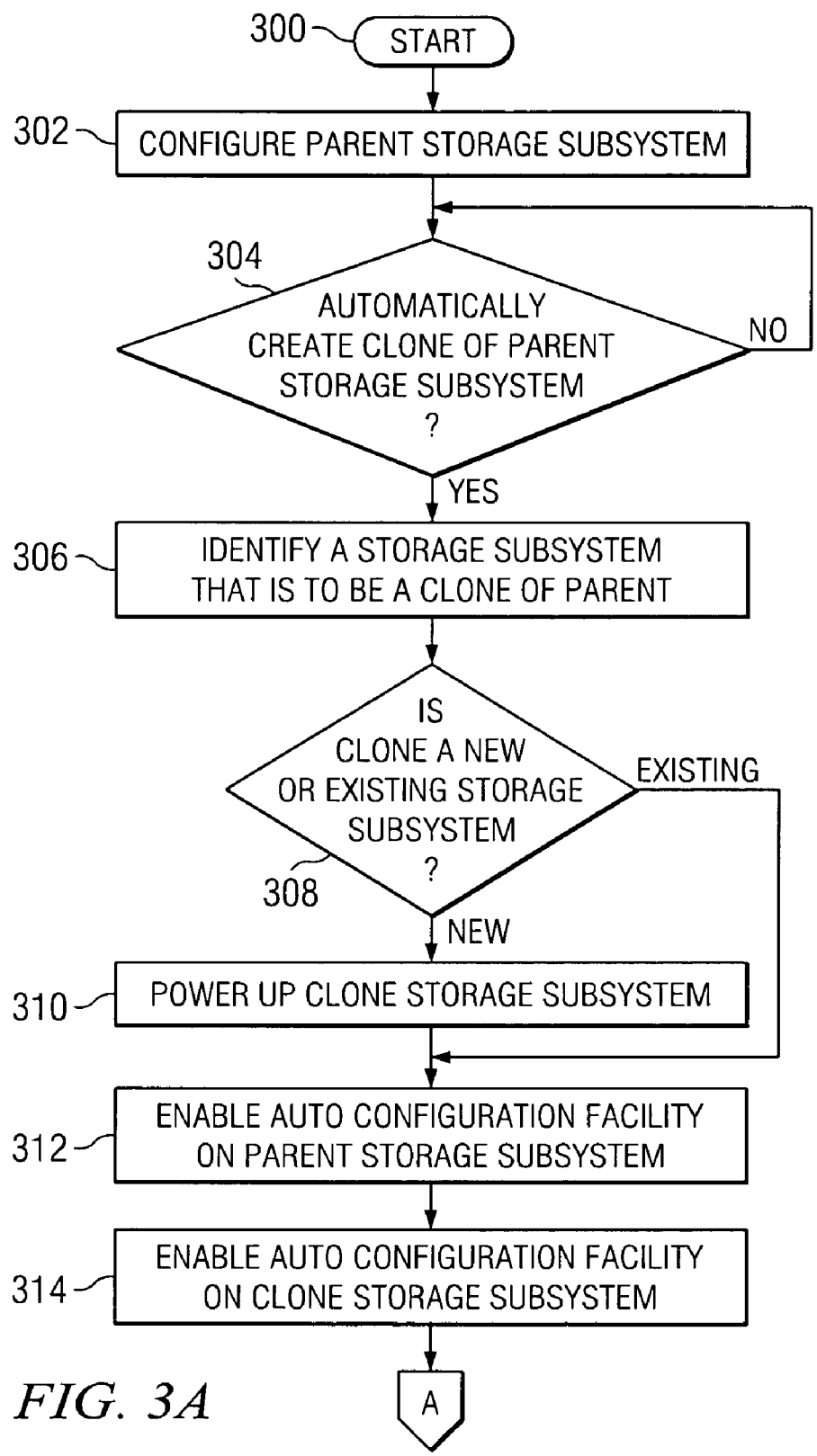
FIGS. 3A–3C together are a high level flow chart that illustrates automatically duplicating a parent storage subsystem's configuration in a clone storage subsystem in accordance with the present invention.
Figure 3B:
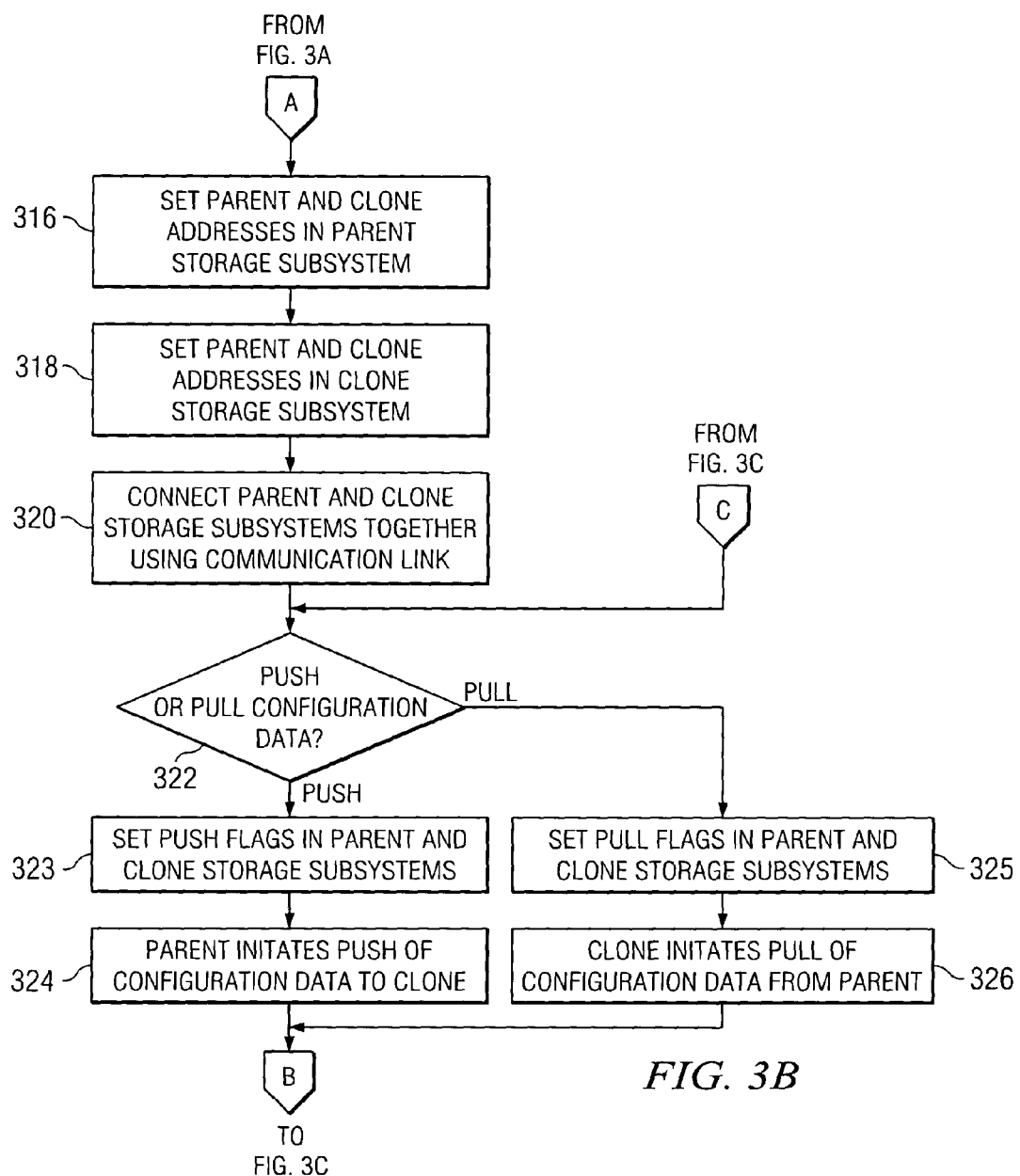
Figure 3C:
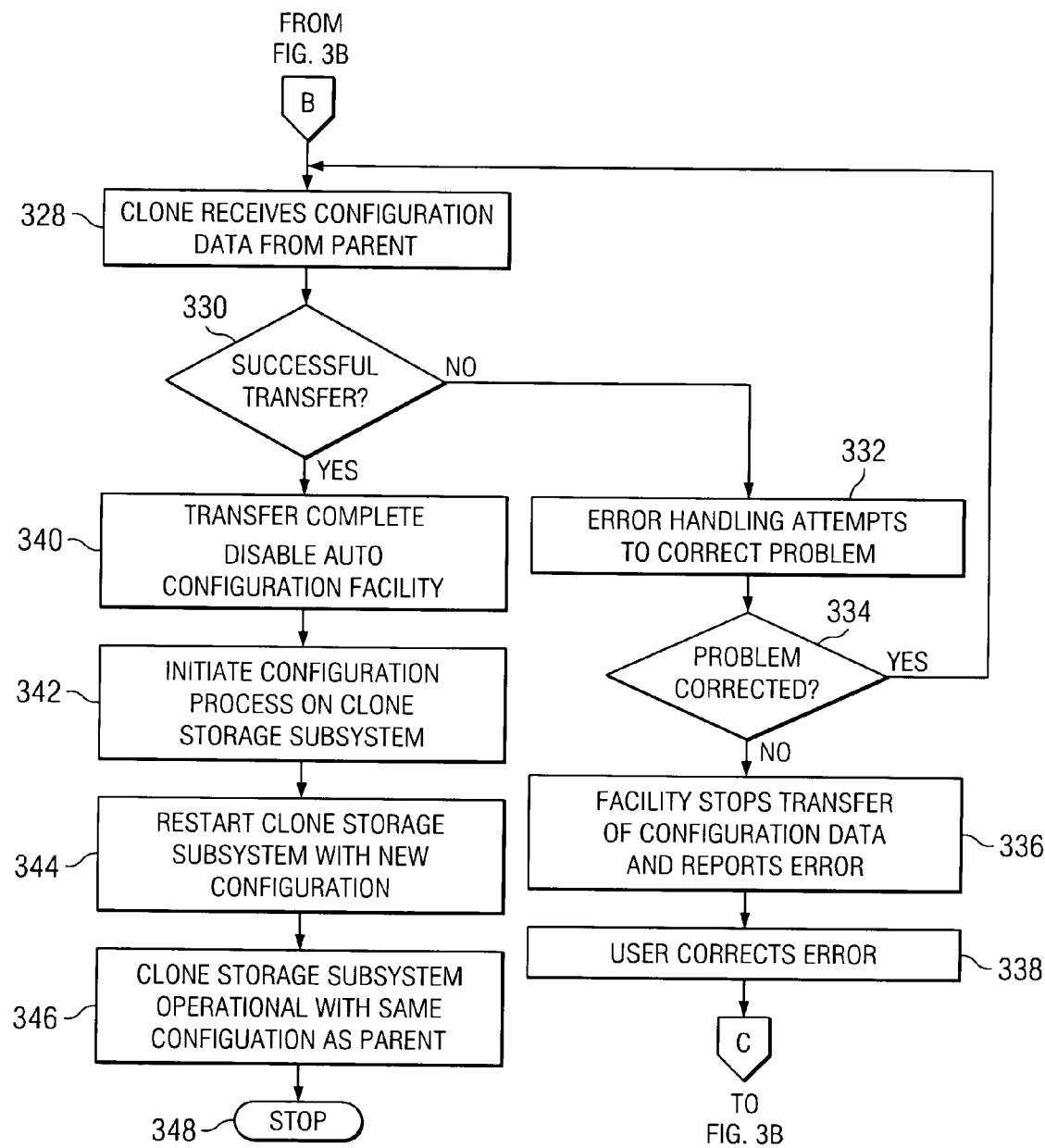

FIGS. 3A–3C together are a high level flow chart that illustrates automatically duplicating a parent storage subsystem's configuration in a clone storage subsystem in accordance with the present invention. The process starts as depicted by block 300 and thereafter passes to block 302 which illustrates a parent storage subsystem being configured. The parent storage subsystem is configured using particular configuration data. This configuration data includes the number of volumes in the parent storage subsystem, names of each volume, number of partitions in the parent storage subsystem, names of each partition, grouping of these volumes and partitions, which ports are connected, the addresses of each port, telephone numbers, site identifier, and any other information that may be used to configure a storage subsystem.

Next, block 304 depicts a determination of whether or not a storage subsystem is to be automatically created that has the same configuration as the parent storage subsystem. This second storage subsystem that is to have the same configuration as the parent storage subsystem is referred to herein as the clone storage subsystem. If a determination is made that no clone is to be created, the process passes back to block 304. If a determination is made that a clone of the parent storage subsystem is to be created, the process passes to block 306 which illustrates identifying a particular storage subsystem that is to be the clone of the parent storage subsystem.

Block 308 depicts a determination of whether or not the storage subsystem that is to be the clone is a new or existing storage subsystem. If a determination is made that the storage subsystem that is to be the clone is a new storage subsystem, the process passes to block 310 which illustrates powering up the clone storage subsystem. The process then passes to block 312. Referring again to block 308, if a determination is made that the storage subsystem that is to be the clone is an existing storage subsystem, the process passes to block 312.

Block 312 depicts enabling an auto configuration facility on the parent storage subsystem. The facility is enabled on the storage subsystems through an enabling software utility that is part of the operating system of the storage subsystem. Next, block 314 illustrates enabling an auto configuration facility on the clone storage subsystem. The process then passes to block 316 as depicted through connector A. Block 316 illustrates setting parent and clone addresses in the parent storage subsystem. Thereafter, block 318 depicts setting parent and clone addresses in the clone storage subsystem.

The process then passes to block 320 which illustrates connecting the parent and clone storage subsystems together using a communication link. This link may be a phone link, network link, or channel link. In accordance with a preferred embodiment, however, the communication link is a direct connection between the two storage subsystems. Preferably, the communication link is a Fibre Channel link between the two storage subsystems. Using the Fibre Channel link, the two storage subsystems can communication out-of-band with only each other.

Next, block 322 illustrates a determination of whether or not the parent will push a copy of its configuration data to the clone system, or whether the clone system will pull a copy of the parent's configuration data from the parent. If a determination is made that the parent will initiate the transfer of the copy of its configuration data, the process passes to block 323 which depicts setting push flags in the parent and clone storage systems to indicate that the parent will push the copy of the parent's configuration data to the clone. Next, block 324 depicts the parent initiating a transfer of the copy of the parent's configuration data to the clone storage subsystem. Thus, the parent will push the copy of its configuration data to the clone. The process then passes to block 328 as illustrated by connector B.

Referring again to block 322, if a determination is made that the clone will initiate the transfer of the copy of the parent's configuration data from the parent to the clone, the process passes to block 325 which illustrates setting pull flags in the parent and clone storage subsystems to indicate that the clone will pull the copy of the parent's configuration data from the parent. Next, block 326 depicts the clone initiating a transfer of the copy of the parent's configuration data from the parent to the clone. Thus, the clone will pull the copy of the parent's configuration data from the parent to the clone. The process then passes to block 328 as illustrated by connector B.

Block 328 depicts the clone receiving the copy of the configuration data from the parent. Next, block 330 illustrates a determination of whether or not the transfer was successful. If a determination is made that the transfer was not successful, the process passes to block 332 which depicts error handling being executed by the auto configuration facility to attempt to correct the problem. Thereafter, block 334 illustrates a determination of whether or not the error handling corrected the problem. If a determination is made that the problem was corrected, the process passes back to block 328.

Referring again to block 334, if a determination is made that the problem was not corrected, the process passes to block 336 which depicts the auto configuration facility stopping the transfer of configuration data from the parent to the clone and reporting an error. Thereafter, block 338 illustrates a user correcting the error. The process then passes back to block 322 as depicted by connector C.

Referring again to block 330, if a determination is made that the transfer was successful, the process passes to block 340 which illustrates the completion of the transfer. Next, block 342 depicts initiating a configuration process on the clone storage subsystem. The configuration process is initiated on the clone by the auto configuration facility upon completion of the transfer. Thereafter, block 344 illustrates restarting the clone storage subsystem with the new configuration data. Thus, the clone storage subsystem and parent storage subsystem now have identical configurations. Block 346, then, depicts the clone storage subsystem being operational with the same configuration as the parent storage subsystem. The process then terminates as illustrated by block 348.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically replicating a first data storage subsystem's configuration data on a second data storage subsystem, each storage subsystem being a peripheral of said data processing system and not a standalone computer system, each storage subsystem being inaccessible directly by users, said method comprising the steps of:
    specifying said first data storage subsystem as a parent subsystem, said first data storage subsystem being configured using a first configuration data;
    specifying a second data storage subsystem that is to be configured the same as said first data storage subsystem;
    automatically initiating by said second data storage subsystem a transfer of a copy of said first configuration data from said first data storage subsystem to said second data storage subsystem, said transfer being executed automatically without user intervention; and
    said second data storage subsystem configuring itself using said copy of said first configuration data, said second data storage subsystem being configured the same as said first data storage subsystem, said second storage subsystem being automatically configured without user intervention.

2. The method according to claim 1, further comprising the steps of:
    automatically initiating by said first data storage subsystem a transfer of a copy of said first configuration data from said first data storage subsystem to said second data storage subsystem.

3. The method according to claim 1, further comprising the steps of:
    enabling an automatic configuration facility on said first and second data storage subsystems.

4. The method according to claim 1, further comprising the steps of:
    enabling an automatic configuration facility on said first and second data storage subsystems;
    automatically initiating by said second data storage subsystem utilizing said automatic configuration facility said transfer of said copy.

5. The method according to claim 1, further comprising the steps of:
    specifying within said first data storage subsystem an address of said second data storage subsystem; and
    specifying within said second data storage subsystem an address of said first data storage subsystem.

6. The method according to claim 1, further comprising the step of:
    coupling said first and second storage subsystems together using a dedicated communication link.

7. The method according to claim 1, further comprising the steps of:
    specifying within said first storage subsystem when said transfer of said copy is to be a push transfer or a pull transfer; and
    specifying within said second storage subsystem when said transfer of said copy is to be a push transfer or a pull transfer.

8. The method according to claim 7, further comprising the steps of:
    in response to a specification that said transfer is to be a push transfer, said first data storage subsystem initiating said transfer; and
    in response to a specification that said transfer is to be a pull transfer, said second data storage subsystem initiating said transfer.

9. The method according to claim 1, further comprising the steps of:
    enabling an automatic configuration facility on said first and second data storage subsystems;
    automatically initiating by said second data storage subsystem said transfer of said copy utilizing said automatic configuration facility; and
    monitoring said transfer by said automatic configuration facility.

10. The method according to claim 9, further comprising the step of:
    executing error handling by said automatic configuration facility to correct any errors that occur during said transfer.

11. A data processing system for automatically replicating a first data storage subsystem's configuration data on a second data storage subsystem, a storage subsystem being a peripheral of said data processing system and not a standalone computer system, said storage subsystem being inaccessible directly by users, comprising:
    said first data storage subsystem being specified as a parent subsystem configured using a first configuration data;
    a second data storage subsystem that is to be configured the same as said first data storage subsystem;
    said second data storage subsystem automatically initiating a transfer of a copy of said first configuration data from said first data storage subsystem to said second data storage subsystem, said transfer being executed automatically without user intervention; and
    said second data storage subsystem configuring itself using said copy of said first configuration data, said second data storage subsystem being configured the same as said first data storage subsystem, said second storage subsystem being automatically configured without user intervention.

12. The system according to claim 11, further comprising:
    said first data storage subsystem automatically initiating a transfer of a copy of said first configuration data from said first data storage subsystem to said second data storage subsystem.

13. The system according to claim 11, further comprising:
    an automatic configuration facility included on said first and second data storage subsystems.

14. The system according to claim 11, further comprising:
    an automatic configuration facility included on said first and second data storage subsystems;
    said second data storage subsystem automatically initiating said transfer of said copy utilizing said automatic configuration facility.

15. The system according to claim 11, further comprising:
    an address of said second data storage subsystem being specified within said first data storage subsystem; and
    an address of said first data storage subsystem being specified within said second data storage subsystem.

16. The system according to claim 11, further comprising:
    said first and second storage subsystems being coupled together using a dedicated communication link.

17. The system according to claim 11, further comprising:
    a flag within said first storage subsystem for indicating when said transfer of said copy is to be a push transfer or a pull transfer; and a flag within said second storage subsystem for indicating when said transfer of said copy is to be a push transfer or a pull transfer.

18. The system according to claim 17, further comprising:

said first data storage subsystem initiating said transfer when said flag in said first data storage subsystem indicates that said transfer is to be a push transfer,; and said second data storage subsystem initiating said transfer when said flag in said second data storage subsystem indicates that said transfer is to be a pull transfer.

19. The system according to claim 11, further comprising:

an automatic configuration facility included on said first and second data storage subsystems;

said second data storage subsystem automatically initiating said transfer of said copy utilizing said automatic configuration facility; and said automatic configuration facility monitoring said transfer.

20. The system according to claim 19, further comprising the step of:

said automatic configuration facility executing error handling to correct any errors that occur during said transfer.

* * * * *